US008832922B1

(12) United States Patent
Frost et al.

(10) Patent No.: US 8,832,922 B1
(45) Date of Patent: Sep. 16, 2014

(54) CONNECTION AND ELBOW IN A GAS APPLIANCE

(75) Inventors: Timothy Frost, Chattanooga, TN (US); Samuel Keith Adams, Chickamauga, GA (US); Tony Byron Leeseberg, Chattanooga, TN (US)

(73) Assignee: Burner Systems International, Inc., Chattanooga, TN (US)

( * ) Notice: Subject to any disclaimer, the term of this patent is extended or adjusted under 35 U.S.C. 154(b) by 210 days.

(21) Appl. No.: 13/613,851

(22) Filed: Sep. 13, 2012

Related U.S. Application Data

(60) Provisional application No. 61/534,069, filed on Sep. 13, 2011.

(51) Int. Cl.
*B23P 11/00* (2006.01)
*B21D 28/28* (2006.01)

(52) U.S. Cl.
CPC ................ *B21D 28/28* (2013.01); *B23P 11/00* (2013.01)
USPC ........................................................ 29/525.11

(58) Field of Classification Search
USPC ................ 29/523, 525.11, 525.13, 515, 516, 29/522.1, 505, 508, 512, 428; 285/382.5
See application file for complete search history.

(56) References Cited

U.S. PATENT DOCUMENTS 4,538,842 A * 9/1985 Kowal et al. ................ 285/354
4,871,199 A * 10/1989 Ridenour et al. .......... 285/382.5

* cited by examiner

*Primary Examiner* — John C Hong
(74) *Attorney, Agent, or Firm* — Stephen J. Stark; Miller & Martin PLLC

(57) ABSTRACT

A connection is provided whereby a first tube, which may be bent into an elbow, has at least one end flow drilled. During the flow drilling process the first end is shortened, reduced in thickness, and most importantly, the inner diameter is increased to accept a second tube. Before connecting the second tube, the first end is preferably tapped with threads which can receive a nut and the nut captures an end of the second tube, preferably entrapping one of at least one bead and a ferrel to provide a connection.

11 Claims, 2 Drawing Sheets

10
14
15
17
21
12
80
16

22
16
18
20

64
30
32
34
24
26
28
62
60
36
14
40
42

16
18
30
48
24
43
72
26
70
52
46
50
14
40
44

80
81
82
86
88
90

84

CONNECTION AND ELBOW IN A GAS APPLIANCE

CLAIM OF PRIORITY

This application claims the benefit of U.S. Provisional Patent Application No. 61/534,069 filed Sep. 13, 2011, incorporated herein by reference in its entirety.

FIELD OF THE INVENTION

The present invention relates to a connection for connecting tubes or pipes together in fluid tight engagement, such as for special applications, and more specifically to connecting an aluminum pipe to a steel elbow which provides gas internally to a broiler element in a gas operated stove.

BACKGROUND OF THE INVENTION

Elbows for use in gas ovens with broiler elements have been used for a number of years. Some competitors provide brass castings for this part. Others, such as the applicant, provided stainless steel elbows which required numerous welding steps to form up components to be able to cooperate with an air shutter at one end internal to the oven as well as an aluminum pipe providing fuel to the elbow external to the heated space in the oven. Since many gas oven with broil elements are self-cleaning ovens capable of reaching temperatures exceeding 800-900 degrees Fahrenheit, the aluminum piping external to the oven is not normally located in the high temperature heated space. Furthermore, harsh cleaning chemicals are also not wisely applied to aluminum.

Machining and/or forming these prior art parts has been proven to be relatively expensive. In the prior art, a welded fitting is provided and fitting up with an outer thread fitting. This machined fitting provided male external threads which cooperated with internal female threads connected to a connector aluminum tube such as with a compression nut and sleeve or a ferrule style connection arrangement. The fitting was welded to the end of a steel tube forming the elbow. On the other end, external threads were machined into the outer surface of the pipe elbow to cooperate with internal threads of a brass orifice.

A need exists to find at least a simplified connector construction and/or elbow construction for the market place.

SUMMARY OF THE INVENTION

It is a present object of the present invention to provide an improved elbow and/or connection system for joining pipes or tubes together.

It is an object of the present invention to provide an improved connection such as from stainless steel to aluminum with a fluid tight connection.

It is a further object of many embodiments of the present invention to provide an improved elbow connection which provides improved connections connecting steel pipe to aluminum pipe at their respective ends in fluid tight engagement.

Accordingly, in accordance with the presently preferred embodiment of the present invention, an elbow connection commonly utilized with gas ovens such as those providing a broiler element is provided. In these style ovens, it is common to use aluminum tubing external to the oven chamber to direct the flow of gas received from a gas source to the stove whether natural gas or propane. However, when entering the oven heated area, the temperatures and environment internal to the oven, such as a self-cleaning oven, could be rather hostile to aluminum and thus a transition to stainless steel (or brass as provided by competitors) often occurs. In order to provide a component which can withstand the higher temperatures and/or harsh corrosive environment possibly contributed to by cleaning chemicals often utilized in ovens, a new elbow is contemplated with at least one improved connection.

In order to make the connection with a new elbow at an external oven connection, a stainless steel tube of a constant diameter is preferably flow drilled in the present instance from having an outer diameter of about ⅜ of an inch to having an outer diameter of about 0.616 inches which is almost doubling the outer diameter. In order to accomplish this flow drill process, a rapidly rotating drill bit expands the material while the end is compressed. In making this end, a tube is compressed by 0.075 inches. As it expands, its wall thickness changes from about 0.065 inches to about 0.040 inches. The inner diameter at the end thus increases relative to the diameter of the untreated section of the pipe by roughly doubling as well.

Within this larger open end, internal threads are tapped into an interior wall. A compression nut provided about an external portion of an inserted aluminum tube with external threads cooperates with the internal threads of the elbow connector portion. Between the compression nut and the end of the inserted tube is at least one of a single external bead, multiple external beads such as double bead, or a ferrule such as a brass ferrule which can compress against the tapering internal walls of the expanded end as the nut is screwed into the internal threads of the larger opening end.

An intermediate portions of the elbow can be flanged to cooperate with a connection of the oven wall and the other end of the elbow can have internal threads which can cooperate with external threads on a nozzle orifice which is preferably spaced from a conical section of the nozzle orifice which can then compress against an end surface of the pipe or tubing once installed to form a fluid tight seal. The nozzle orifice can then be connected to an air shutter to provide air gas mix to the boiler burner located downstream. A bend normally occurs between the two ends. This elbow construction provides advantages of prior art constructions and is believed to require fewer machining steps and/or provides simpler machining efficiency and/or a likely higher quality control capability than other designs.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
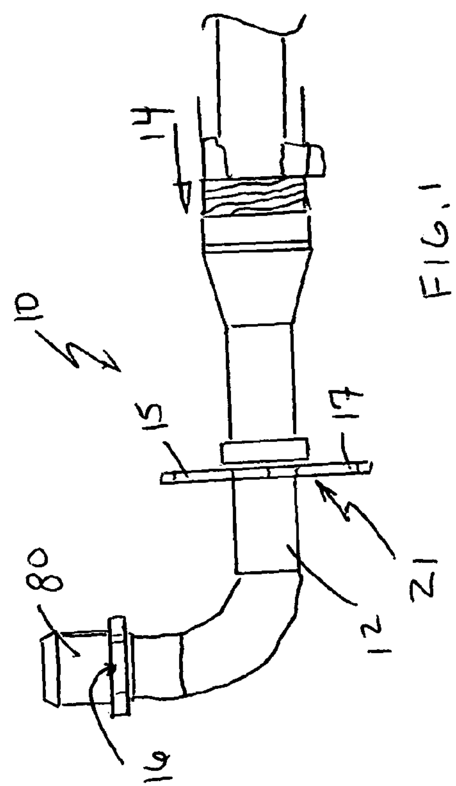
FIG. 1 shows an external side plan view of the presently preferred embodiment of the present invention.

FIG. 1 shows a first presently preferred embodiment of the present invention in the form of an elbow 10 such as an elbow tube as utilized with broiler burners in a gas stove. As discussed above, the elbows, such as elbow 10, are utilized to transition from external to internal to the oven compartment particularly for self-cleaning ovens with broiler elements which can often reach temperatures of about 900 degrees Fahrenheit or more and also be subjected to harsh chemicals such as oven cleaner chemicals inside the oven. An aluminum element would not fare well in such an environment.

Accordingly, the preferred embodiment is preferably made of steel such as cold-rolled steel which has been treated such as with a chrome plating process or other appropriate preselected material. Other appropriate materials may be utilized with other embodiments. Elbow 10 is comprised of a tube 12 having a first 14 and a second end 16. Between first and second ends 14,16, there is normally a bend 18 such as an elbow bend as illustrated. Flange 21 is also normally provided with bores 15,17 shown in phantom to connect to an internal oven wall (not shown) or other connection location.

First and second segments 20,22 on either side of the bend 18 and/or flange 21, if provided, can be provided as required by manufacturers to accommodate particular styles of oven equipment. Other segments could be provided and/or other design criteria accommodated with other embodiments. First segment 24 of first tube 12 preferably provides an outwardly flared segment extending from first portion 20 to a second segment 26. Second segment 26 is preferably provided with internal threads 28 which can be tapped to provide an internally threaded second segment 26 after providing the outwardly flared first segment 24.

Internal or inner surface 30 of outwardly flared first segment 24 preferably is at least relatively smooth if not deburred, if necessary, so as to be in a proper condition as will be described in further detail below. The applicant has manufactured the elbow 10 by taking a straight segment of stainless steel tubing, bending it to provide bend 18, and utilizing a flow drill to compress and expand the first end 14 to provide the outwardly flared segment 24 as well as the second segment 26. Second segment 26 may then be tapped to provide internal threads 28. Second segment 26 may have a relatively consistent inner and/or outer diameter as shown or taper like first segment 24 for other embodiments.

In performing the flow drill process, the 0.065 thickness of first pipe wall portion 32 is transitioned to about a 0.040 thickness at second pipe wall portion 34. Thus, a wall reduction of somewhere between about 25% to 50% occurs, and more thoroughly about ⅓ of the thickness of the wall decreases at least in some portion of a first segment 24, and second segment. Furthermore, as this process occurs, the length is shortened at the first end 14 as first end 14 is compressed towards the second end 16 during the flow drilling process. A shortening of about 0.075 has been measured during this process. Outwardly second segment 26 may have a relatively constant internal diameter particularly after tapping, such as about 0.58 which stands in contrast to the inner diameter of about 0.25 of tube segments 20,22. The inner diameter increases from roughly doubles and preferably increases the fact of somewhere between about 1.5 times the original inner diameter to about three times, and more preferably, about two times the inner diameter. After tapping second segment 26 can cooperate with a 7/16 external threads shown as nut threads 36 provided a nut 40. One will note that nut 40 is identically shown in the various embodiments as is the construction of the first end 14. Other nuts 40 could be provided with other embodiments.

Figure 2:
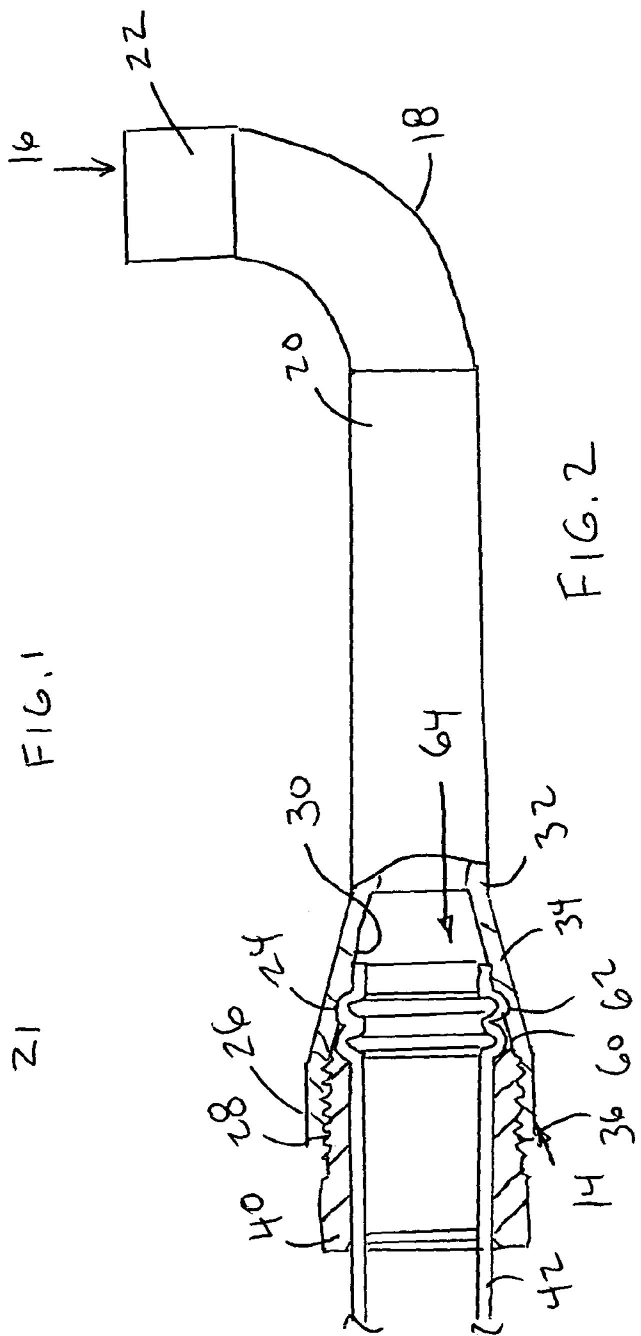
FIG. 2 shows a side partially cut-away view showing the connection of the construction of FIG. 1 to a cooperating tube.
Figure 3:
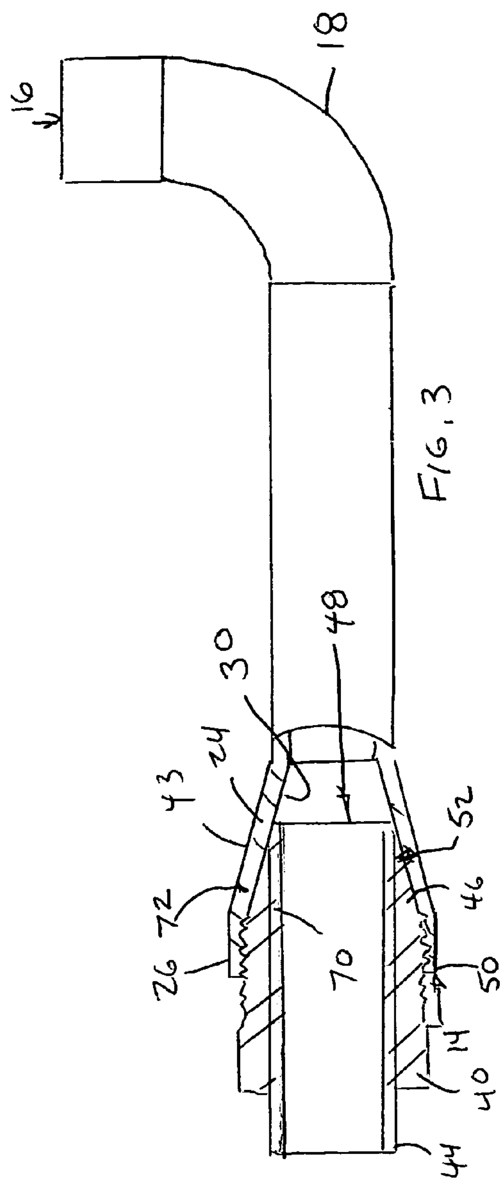
FIG. 3 shows a side partially cut-away view showing a first alternatively preferred embodiment showing connection of FIG. 1 to a cooperating tube.

The difference in the embodiments of FIG. 2 and FIG. 3 is that the connections for other connected tube 42,44 are slightly different. A relatively straight segment of the tube 44 is illustrated for a first connection. A ferrule 46 is shown provided towards the first end 48 and then as the compression nut 40 is directed by screwing its threads relative to the second segment 26 and outwardly flared section 24 to provide a fluid tight seal against the inner surface 30 of the first section 24. The ferrule 46 is simultaneously compressed against the exterior surface 43 of the tube 44. The first end 48 of the tube 44 may also contact the internal surface 30 of the second segment 26 to assist in providing a fluted tight seal 24 as well.

In the presently preferred embodiment of FIG. 2, one or more beads illustrated as first and second beads 60,62 can be provided toward a first end 64 of tube 42. More or fewer beads 60,62 may be provided in other embodiments. In this construction, the first tube 42 effectively provided with a built in ferrule. As the compression nut 40 is tightened with threads 36 relative to threads 28, at least one bead 62 is placed in contact with the inner surface 30 of the outwardly flared first section 24 and possibly in combination with the first end 64 contacting internal surface 30 to provide a fluid tight seal. Other beads such as first bead 60 could also contact inner surface 30. In this embodiment, the only possible source of fluid leakage is past the external portion of first bead 62. In the embodiment of FIG. 3, a leakage could occur along internal surface 70 of the ferrule 52 as well as along an external surface 72 of the ferrule 52. Providing one or more beads such as 60,62 is a process discussed in various other patents other than that of the applicant such as U.S. Pat. No. 5,573,285 and others.

Figure 5:
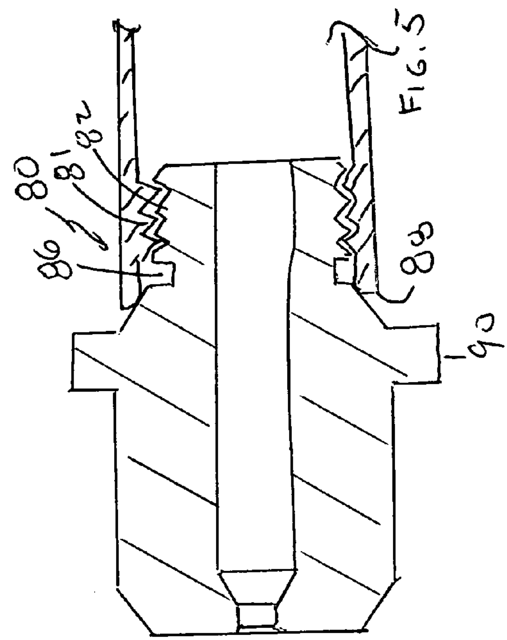
FIG. 5 shows a cross-sectional view of an orifice connected to a second end of the elbow as shown in FIG. 1.
Figure 4:
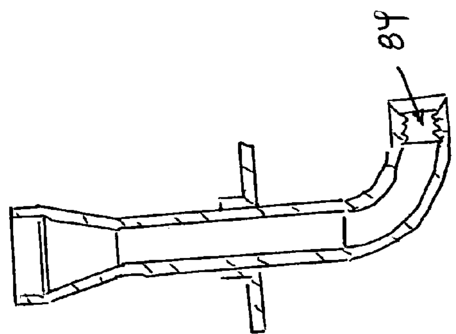
FIG. 4 shows a cross-sectional view of the elbow of FIG. 1 prior to connecting to an orifice.

The second end 16 may be machined to provide inwardly directed threads 81 which can then cooperate with a screw in orifice 80. Orifice 80 may have outwardly directed threads which can provide a situation where the second end 16 is internally tapped such as to provide 5/16 threads internal to the inner bore. Then, a cooperating orifice 80 such as shown in FIG. 5 can be screwed therein with outwardly directed threads 82. The inwardly directed threads 84 at the second end 16.

In addition to having the outwardly directed threads 82, the outwardly directed threads 82 are preferably spaced by channel 86 from first row conical section 88 which may begin radially at the termination of the threads 82 and can extend radially outwardly preferably at least a substantial portion of the thickness of the tube portion 22, if not past tube portion 22 so that when the orifice 80 is screwed on to the second section 22, the first conical section 88 effectively forms a seal at the second end 16 as shown in FIGS. 1 and 5 to form a fluid tight seal. The flats 90 can cooperate with a wrench to provide the appropriate amount of torque. The orifice 80 provides a measured flow path to a air shutter (not shown) internal to an oven and to provide a fuel/gas mixture to an internal broiler element for use by a gas oven.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of manufacturing an improved connection comprising:

proving a steel length of a first tube;

bending the first tube at an elbow;

at a first end of the first tube, flow drilling the first tube at a first end thereby increasing an inner diameter at the first end at least about 1.5 times, and then tapping internal to the first end to provide threads.

2. The method of claim 1 wherein during the step of flow drilling the first tube, increasing the inner diameter at the first end about 1.5 to about 3 times.

3. The method of claim 2 wherein during the step of flow drilling the first tube, increasing the inner diameter at the first end to about 2 times.

4. The method of claim 1 wherein during the step of flow drilling the first tube, achieving a wall thickness reduction of at least about 25% while increasing the inner diameter at the first end.

5. The method of claim 1 during the step of flow drilling the first tube, shortening a length of the first tube at the first end while increasing the inner diameter at the first end.

6. The method of claim 1 further comprising the step of capturing a second tube at the first end with a nut screwed into the threads.

7. The method of claim 6 wherein during the step of capturing the second tube, one of at least one bead and a ferrel about an exterior surface of the second tube is captured near an end of the connected tube intermediate the first and second tubes.

8. A method of manufacturing an improved connection comprising:

proving a steel length of a first tube;

bending the first tube at an elbow;

at a first end of the first tube, flow drilling the first tube at a first end thereby shortening a length of the first tube at the first end while increasing an inner diameter at the first end, and then tapping the first end to provide threads.

9. The method of claim 8 wherein during the step of flow drilling, shortening the first end at least 0.075 inches; and further comprising the step of capturing a second tube at the first end with a nut screwed into the threads.

10. The method of claim 8 wherein during the step of flow drilling, achieving a wall thickness reduction of at least 25%; and further comprising the step of capturing a second tube at the first end of the first tube with a nut screwed into the threads with one of at least one bead and a ferrel about an exterior surface near an end of the second tube captured by the nut in the first end to provide a connection.

11. The method of claim 8 wherein during the step of flow drilling, increasing the inner diameter at least about 1.5 times; and further comprising the step of capturing a second tube at the first end of the first tube with a nut screwed into the threads entrapping one of at least one bead and a ferrel about an exterior surface of the second tube near an end of the second tube to provide a connection.

* * * * *